Figure 3:
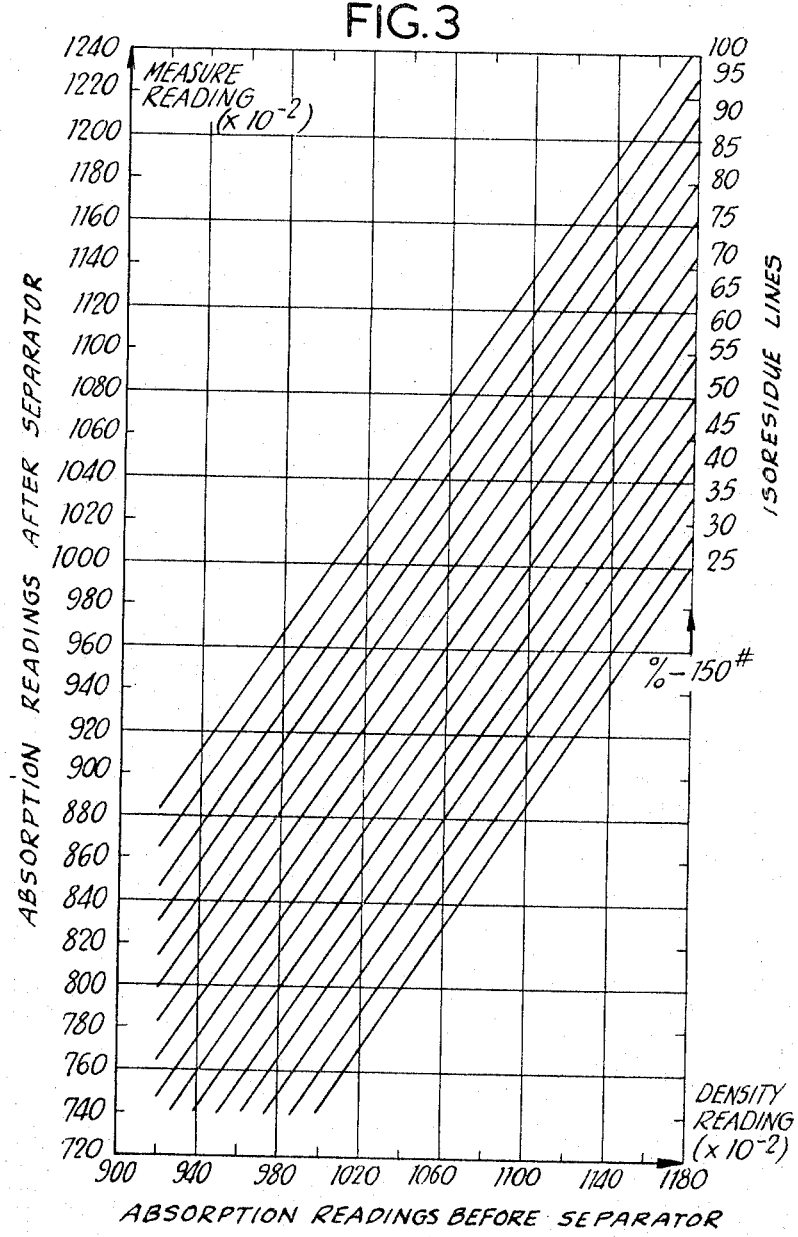

United States Patent [19]
Starnes

[11] 3,745,339
[45] July 10, 1973

[54] PARTICLE SIZE ANALYSIS
[75] Inventor: Peter Edward Starnes, Earley, Reading, Berkshire, England
[73] Assignee: Cartner Group Limited, Middlesex, England
[22] Filed: July 1, 1970
[21] Appl. No.: 51,503

[30] Foreign Application Priority Data
July 1, 1969 Great Britain.................33265/69

[52] U.S. Cl. ............................ 250/43.5 D, 250/48
[51] Int. Cl. ......................................... G01n 23/12
[58] Field of Search................. 250/43.5 D, 83.3 D, 250/105, 46, 48, 51.5

[56] References Cited
UNITED STATES PATENTS
3,505,519 4/1970 Fleming et al.................. 250/43.5 D
3,529,151 9/1970 Corr-Brion..................... 250/43.5 D
3,500,446 3/1970 Hasegawa et al............. 250/43.5 D Primary Examiner—James W. Lawrence
Assistant Examiner—Davis L. Willis
Attorney—Cushman, Darby & Cushman

[57] ABSTRACT

In the carrying out of fineness measurements upon a flowing suspension of solids in a liquid by the application of a force field, the flow of the suspension through the apparatus is under a constant head and two or more radiation absorption measurements upon the suspension are made at least one of which is made subsequent to the application of the force field. From these measurements the fineness of the solids present is deduced, being expressed in terms of the proportion by weight coarser than a given standard sieve mesh.

8 Claims, 6 Drawing Figures

Patented July 10, 1973
3,745,339
5 Sheets-Sheet 1
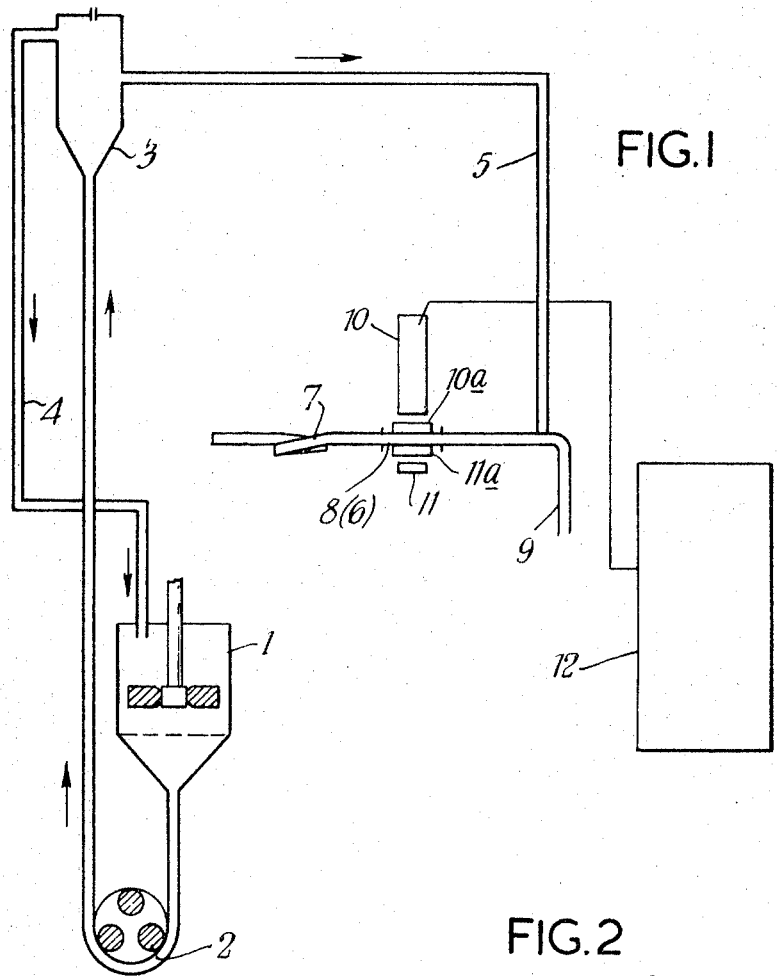
FIG.1
FIG.2
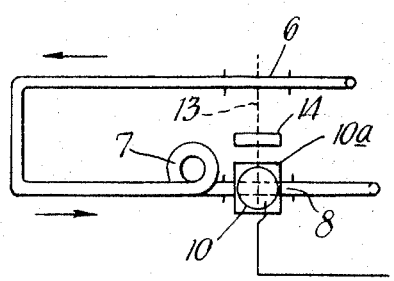
INVENTOR
Peter Edward Doe
BY
Cushman Darby & Cushman
ATTORNEYS

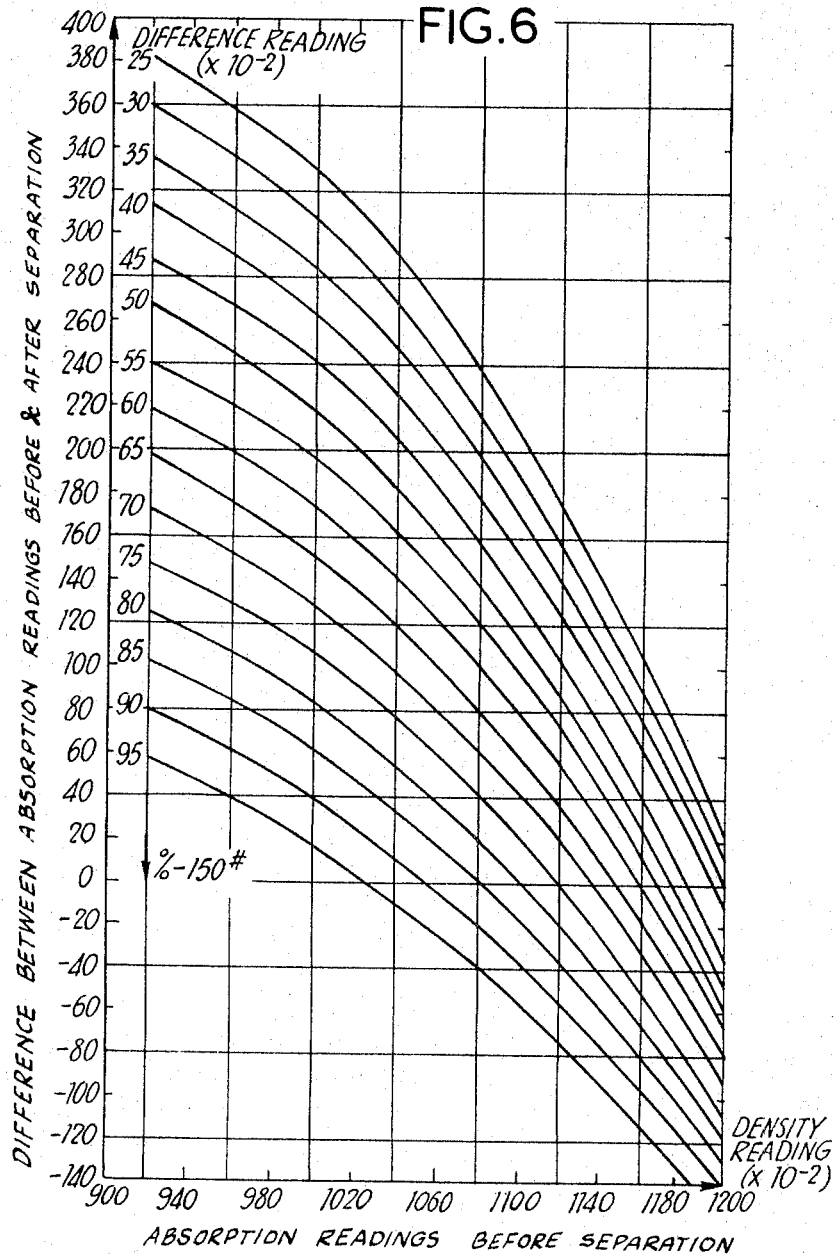

PARTICLE SIZE ANALYSIS

This invention relates to the measurement of the fineness of solid materials in liquid suspension, the fineness being conveniently expressed in terms of the proportion of the solid material by weight which is coarser than a given standard sieve mesh.

It is known in principle to carry out determinations of fineness on flowing suspensions of solid materials by subjecting the suspension to a force field and measuring the change in concentration of the solid phase across the flow path induced by the force field by radiation absorption means. The Patent to Fleming et al., No. 3,505,519 dated Apr. 7, 1970, discloses a method of onstream measurement of particle size distribution in a suspension, comprising using the effect of an applied force field to distribute the particles according to their size across a channel in which the stream flows, and measuring the varying concentration of the particles across the flow channel due to this distribution.

Hitherto the practical application of this method has required that the flow velocity of the suspension be maintained constant at a pre-determined value during the measurement time and that the solid content of the suspension be known.

It is a main object of this invention to provide a method of, and apparatus for, carrying out fineness measurements upon a flowing suspension of solid materials in liquid medium in a manner which avoids the necessity for maintaining constant flow conditions.

It is another object of the invention to permit such measurements to be made on a suspension of unknown solids content.

It is a further object of this invention to provide means whereby the results of measurements made on flowing suspensions may be repidly and accurately interpreted in terms of the fineness of the solids present, expressed as the proportion by weight coarser than a given standard sieve mesh.

According to one aspect of the invention, there is provided a method of carrying out fineness measurements upon a flowing suspension of solids in a liquid medium by the application of a force field, characterized by the fact that the flow of the suspension through the apparatus is under the influence of a constant head and that the fineness of the solids present expressed in terms of the proportion by weight coarser than a given standard sieve mesh is deduced by combining two or more radiation absorption measurements made upon the suspension, at least one of which measurements is made subsequent to the application of said force field. It is further characteristic of the method that the combination of the aforesaid measurements can be conveniently effected using a nomogram technique.

According to a further aspect of the invention, there is provided apparatus for carrying out fineness measurements upon a flowing suspension of solids in a liquid medium which includes one or more flow conduits, means incorporating a constant head device for causing the suspension to flow through the conduit or conduits, means for applying a force field to the suspension in a direction substantially at right angles to the direction of flow and means for carrying out two or more radiation absorption measurements upon the flowing suspension at pre-determined positions along the flow path at least one of which is subsequent to the application of said force field.

Figure 4:
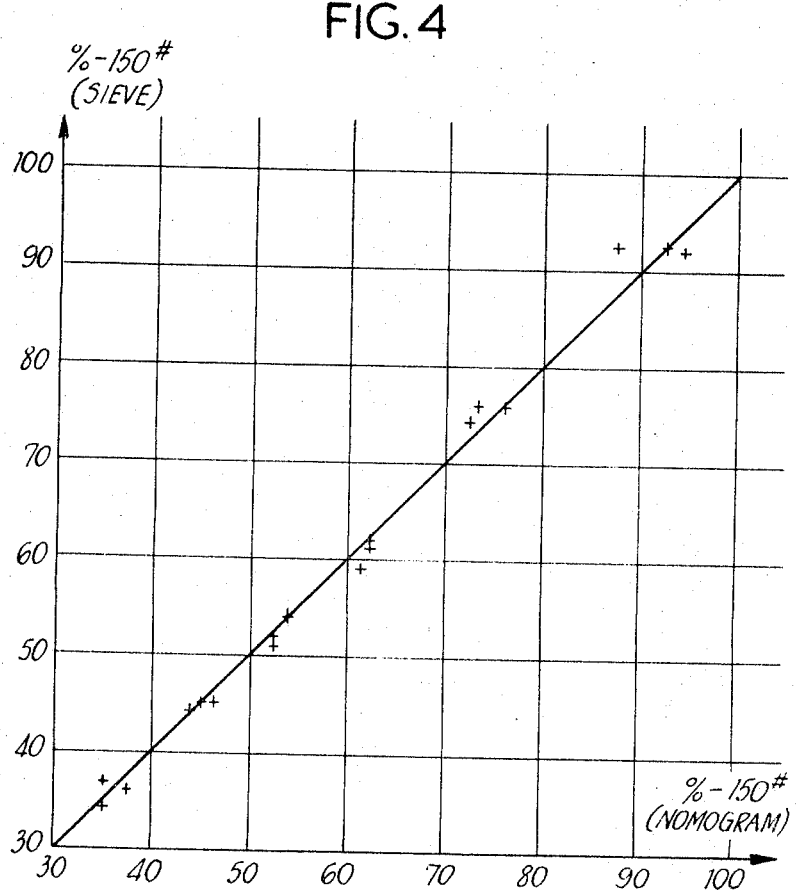
Figure 5:
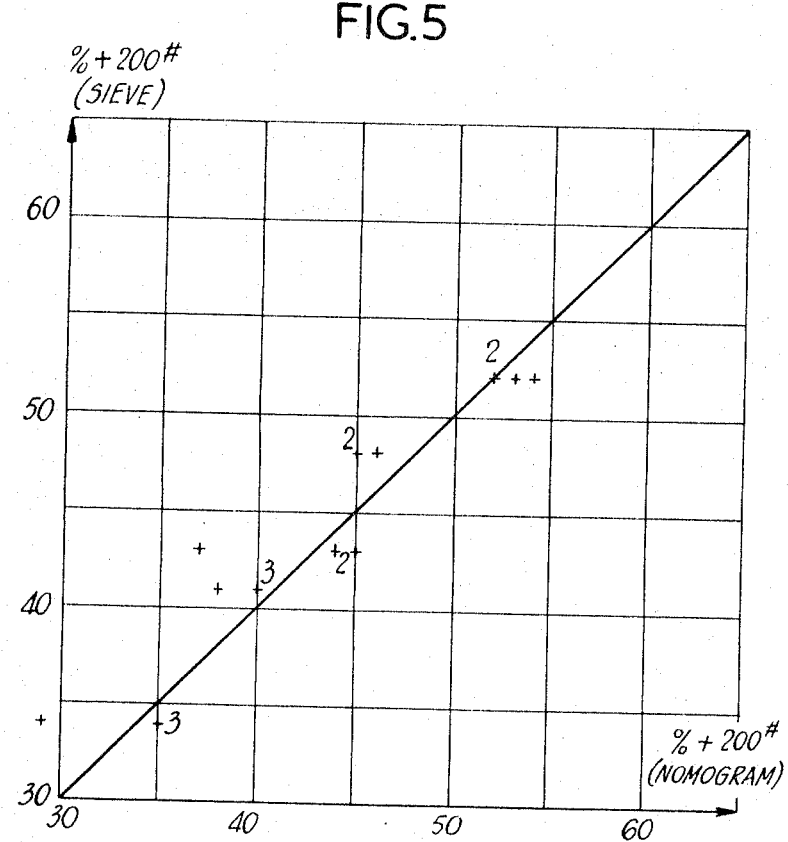

In order that the invention may be clearly understood and readily carried into effect, one embodiment thereof will now be described with reference to the accompanying drawings, in which, FIG. 1 shows a diagrammatic elevation of the apparatus, FIG. 2 shows a detail of the apparatus in plan, FIG. 3 is a suitable form of nomogram of readings after the sample has passed through a separator, as will be described, plotted against readings taken before entry into the separator, the diagonal lines corresponding to a given percentage of sample passing a particular sieve, FIG. 4 shows a graph of the results obtained from a standard sieving procedure plotted against readings from the apparatus as processed by the nomogram of FIG. 3 in respect of a given material, FIG. 5 shows a graph of the results similarly obtained for another material, and FIG. 6 shows a nomogram constructed in the manner of FIG. 3 but in respect of the differences between two readings taken after passage through the separator plotted against readings taken before separation.

Referring to FIGS. 1 and 2 a stirred mixing tank 1 is in communication with a slurry pump 2 by conduit means and the latter is similarly connected to a constant head tank 3. An overflow conduit 4 from the tank 3 communicates with the mixing tank 1, while a constant head delivery conduit 5 is connected to a presentation conduit 6 which in turn communicates with a helical separator 7 leading via a second presentation conduit 8 to a discharge conduit 9. A sensing head 10 of known form is provided by means of which measurements can be made of the relative absorption by the flowing suspension of the beta-rays emitted by a radioisotope source 11 at predetermined positions in the two presentation conduits and the results of the measurements indicated or recorded by known electronic means, e.g. an electronic display means 12. In known manner the sensing head 10 and radioisotope source 11 are each shielded by a collimator (10a and 11a) and the source 11 is strip-like, with a length in the order of 25 mm, to correspond with, but to overlap, the associated collimating slit which has a width in the order of 1 mm. Furthermore the head and source 10, 11 form an assembly which is rectilinearly movable along a path indicated by the dotted line 13 on which the assembly has four defined positions. The first position is centrally disposed on the axis of the conduit 6, the second position is between the two conduits and in this position the assembly co-operates with a standardising absorber 14, and the third and fourth positions are respectively adjacent the two side walls of the conduit 8.

The apparatus just described is intended to be used for the determination of the fineness of flowing suspensions of mineral materials in liquid. The method of operation for this purpose is as follows. The mineral suspension is introduced into the mixing tank 1 and circulated through the apparatus under the influence of the pump 2 and a representative volume passes through the presentation conduit 6, the helical separator 7 and the presentation conduit 8 under constant head conditions.

The suspension issuing from the discharge conduit may be discarded or may be returned to the mixing tank, that is the apparatus may be operated under either open or closed circuit conditions. By means of the sensing head and its associated electronics, beta-ray absorption measurements are made through the flowing suspension at predetermined positions in the flow path, the measurements consisting either of single measurements respectively before and after the passage of the sample through the helical separator or a single measurement before separation and two measurements after this operation. These measurements may be conveniently combined by means of a nomogram to yield an index of the fineness of the mineral material in terms of the proportion by weight coarser than a given standard sieve mesh, the nomogram being constructed in the light of results obtained with samples of similar material of known fineness. By choice of a suitable form of nomogram, variations in the relationship between the beta-ray absorption measurements and the solids content of the suspension due to changes in specific gravity of the mineral material within a substantial range can be rendered unimportant.

A suitable form of nomogram is shown in FIG. 3 in which the ordinate readings are those taken at a position adjacent on edge of the presentation conduit 8 and the abscissa readings are those taken at a median position across the flow path in the conduit 6. The diagonal lines which represent the flow path in the conduit 6 are "isoresidue" lines each of which correspond to a given percentage of sample passing through a nominated sieve which in this case is B.S. 150.

FIG. 4 shows a graph of the results from a standard sieving procedure plotted against the results obtained when readings from the apparatus are processed by means of a nomogram for a material of substantially constant specific gravity (nepheline syenite)

FIG. 5 shows results similarly obtained for a number of samples of copper concentrator pulps having (CU + Fe) contents ranging from 2.7 to 57.4 percent and hence being of widely differing specific gravities. It will be seen that, despite this fact, the samples conform adequately to the same calibration line. Alternatively, a nomogram may be constructed using the differences between two readings made at two different points across the presentattion conduit 8 after separation together with the readings made before separation as hereinbefore described. Such a nomogram is shown in FIG. 6. Although this second form of nomogram corresponds most closely with the relevant theoretical relationships, the first (FIG. 3) usually provides adequate accuracy and simplifies the measurement and data processing procedures.

It will be understood from the description provided that the method and apparatus herein disclosed permit sizing measurements to be made on suspensions of solids in liquids without the necessity for maintaining the solids content at a known predetermined level, as was previously required. In practice satisfactory measurements have been made on suspensions having solids contents in the range 10–30 percent by weight. It will further be appreciated that this facility results from a method of combining two or more measurements made under constant head flow conditions. This is to be distinguished from combining measurements made under conditions of constant flow velocity. Since in the former case, the flow is not maintained constant but varies with the density and viscosity of the sample material. The ablity to obtain satisfactory results without the need for operating under conditions of known and predetermined flow-rate confers significant advantages by way of simplification and reduction in cost of the apparatus required.

I claim:

1. A method of carrying out fineness measurements upon a flowing suspension of solids in a liquid medium including the steps of subjecting the suspension to a force field transverse to the direction of flow and measuring the change in concentration of said solids in said liquid medium transverse to the flow path induced by the force field by radiation absorption means, wherein the improvement comprises flowing the suspension through the apparatus under the influence of a constant head and conducting radiation absorption measurements on said flowing suspension at plural positions along the path of flow wherein at least one of said measurements is made prior to and at least one other measurement is made subsequent to the application of said force field and the fineness of the solids present is deduced by comparing the plurality of radiation absorption measurements made upon the suspension to like measurements of known particle sizes suspended in said medium.

2. A method as set forth in claim 1, in which single radiation absorption measurements are made respectively before and after the application of the force field.

3. A method as set forth in claim 1, in which the single radiation measurement is made before the application of the force field and two such measurements are made after the application of the force field.

4. A method as set forth in claim 1, in which the combination of the said measurements is effected using a nomogram technique.

5. Apparatus for carrying out fineness measurements upon a flowing suspension of solids in a liquid medium including one or more flow conduits, means incorporating a constant head device for causing the suspension to flow through a conduit or conduits, means for applying a force field to the suspension in a direction substantially at right angles to the direction of flow and means for carrying out two or more radiation absorption measurements upon the flowing suspension at plural positions along the flow path at least one of which is subsequent to the application of said force field.

6. Apparatus as set forth in claim 5, including two presentation conduits disposed respectively upstream and downstream of the force field applying means, the means for carrying out two or more radiation absorption measurements comprising a radiation source and sensing head assembly which is rectilinearly movable between positions accurately defined with respect to the two conduits.

7. Apparatus as set forth in claim 6 in which a standardising absorber is provided between the two conduits and the assembly has an intermediate position which is accurately defined with respect to the absorber.

8. Apparatus as set forth in claim 6, in which the assembly has two accurately defined positions with respect to the presentation conduit downstream of the force field applying means, said positions being adjacent the respective side walls of the said conduit.

* * * * *